FIG. 2.
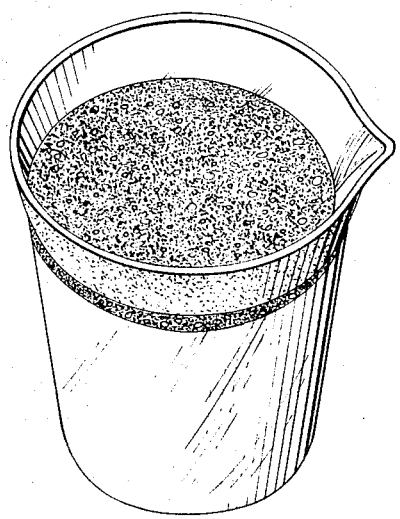
2(A)
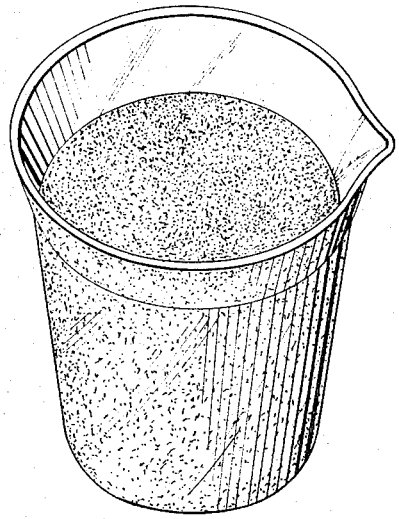
2(B)

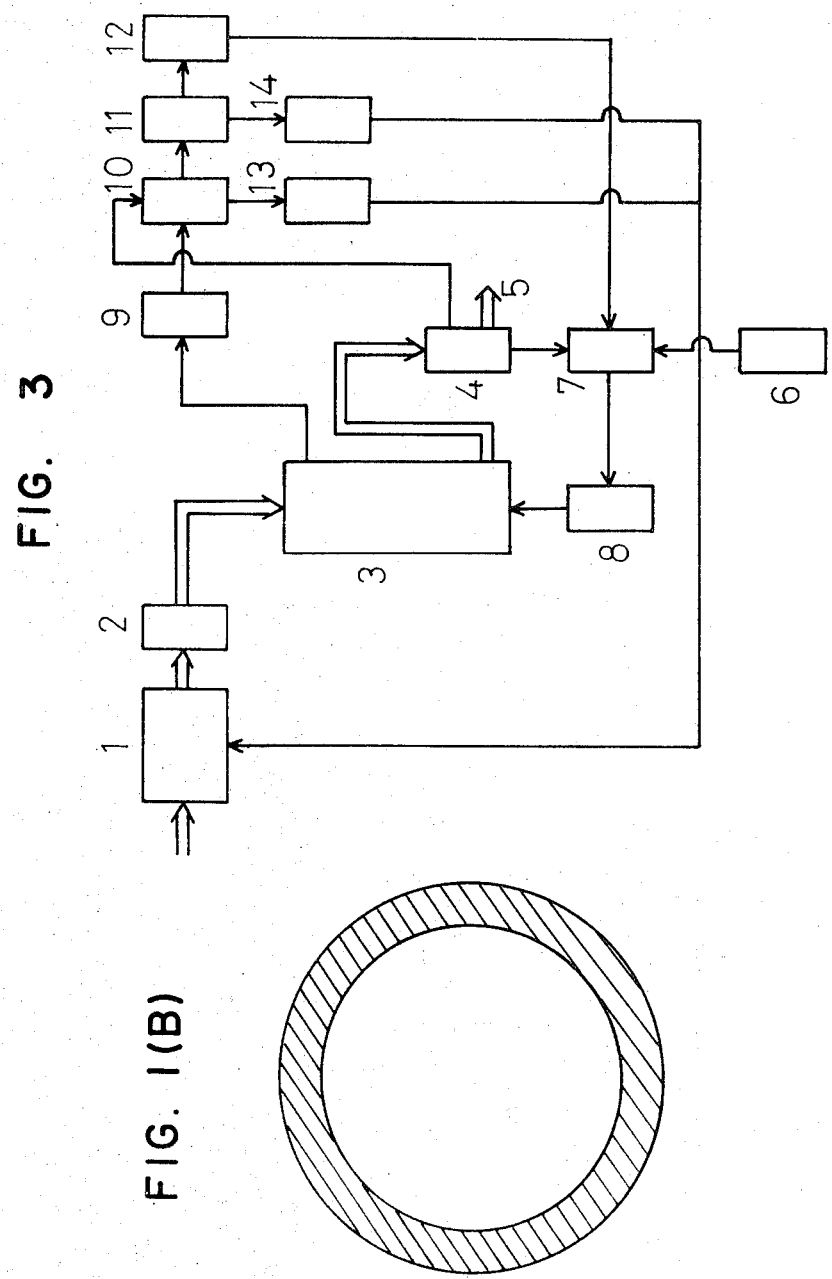

3,775,344
ACTIVE CARBON HAVING A HOLLOW MICROSPHERICAL STRUCTURE
Yasuo Amagi and Ryoichi Takahashi, Tokyo, and Masakatsu Wagu, Sendai, Japan, assignors to Kureha Kagaku Kogyo Kabushiki Kaisha, Tokyo, Japan
Filed Sept. 16, 1971, Ser. No. 181,038
Claims priority, application Japan, Nov. 14, 1970, 45/10,057
Int. Cl. C01b *31/08*
U.S. Cl. 252—444                    2 Claims

ABSTRACT OF THE DISCLOSURE

Active carbon having a hollow microspherical structure is provided by subjecting carbon having a hollow microspherical structure to activation conducted at 400–1000° C. in an atmosphere of air, steam or carbon dioxide.

BACKGROUND OF THE INVENTION

Figure 1:
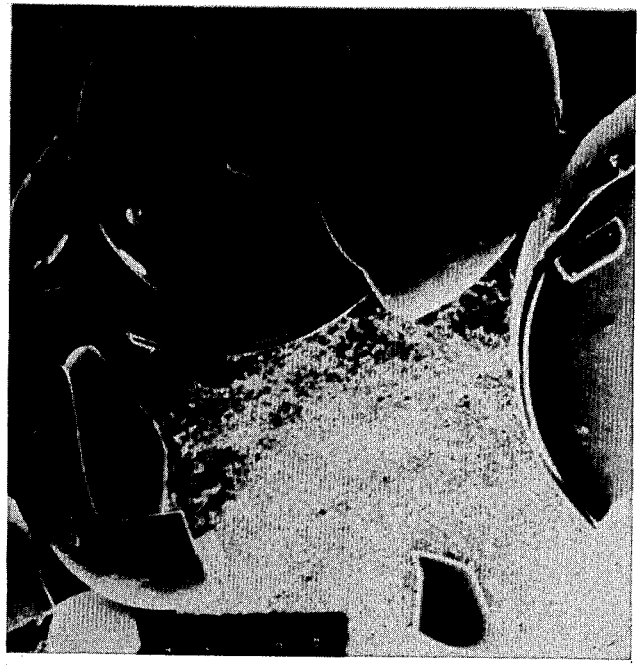

This invention relates to active carbon having a hollow microspherical structure. Active carbon in a variety of forms are now commercially available and a number of processes for producing same having been proposed hitherto. However, activated carbon having a hollow microspherical structure is not disclosed in the prior art.

SUMMARY OF THE INVENTION

It has now been discovered that active carbon having a hollow microspherical structure can be obtained by subjecting the hollow microspherical carbon to an activation treatment.

It is an object of this invention to provide active carbon having a hollow microspherical structure.

It is another object of this invention to provide a process for the production of active carbon having a hollow microspherical structure.

It is a further object of this invention to provide a method of cleaning waste water with active carbon having a hollow microspherical structure.

These and other objects as well as the merits of this invention will become apparent from the detailed description to follow taken in conjunction with the accompanying drawings.

The active carbon having a hollow microspherical structure produced according to this invention has a particle diameter of 5–1000μ, a wall thickness of 0.5–50μ and a bulk specific gravity of 0.05–0.4.

The hollow microspherical carbon used in this invention is produced from tars obtained by subjecting petroleum hydrocarbons such as crude oil, asphalt, heavy oil, light oil, kerosene and naphtha to a thermal treatment conducted at a temperature of 700–1500° C. for 0.001–2 seconds and to distillation to remove low molecular components and oily substances. The resulting product is a highly aromatic hard pitch having a softening point of 100–350° C., a nitrobenzene-insoluble component of 0–25% and a H/C ratio of 0.2–1.0. The resulting pitch is then admixed homogeneously with an expanding agent which is an organic solvent having a low boiling point and good compatibility with the pitch, for example, an aromatic hydrocarbon such as benzene, toluene or xylene; an ether such as tetrahydrofuran or butyl ether; or an aliphatic hydrocarbon such as pentane, hexane or heptane. The mixture is dispersed in water with a protective colloid, such as partially saponified polyvinyl acetate, polyvinyl alcohol, methylcellulose, carboxymethylcellulose, polyacrylic acid or a salt thereof, starch, konjac flour, gum arabic or gelatin. The resulting dispersion is subjected to momentary heating or rapid temperature-elevation heating whereby the dispersed pitch particles are foamed to form hollow microspheres which are then subjected to infusibilization treatment with an oxidative gas or liquid. The hollow microspheres are finally carbonized by baking at an inert gas atmosphere to yield carbon having a hollow microspherical structure.

In accordance with this invention, the hollow microspherical carbon obtained by the above process can be activated according to a known method by heating the carbon at 400–1000° C. in air, steam or carbon dioxide.

As described above, the active carbon produced according to this invention has a particle diameter of 5–1000μ, a wall thickness of 0.5–50μ and a bulk specific gravity of 0.05–0.4 and has a hollow microspherical structure.

FIGS. 1(A) and 1(B) of the drawings show the structure of the active carbon obtained according to this invention. FIG. 1(A) is a photograph showing a section of the active carbon microspheres obtained according to this invention. FIG. 1(B) is a schematic view of a section of an active carbon microsphere.

The active carbon of this invention is characterized in that it has a smaller specific gravity than known activated carbons and in that it has a spherical structure. Because of its low specific gravity, it floats in water, thus facilitating its separation after use. Because the active carbon is spherical, it has excellent fluidity and therefore is easily handled. For example, very excellent results can be achieved when the active carbon of this invention is used as carrier for a catalyst used in a fluidized bed. Furthermore, when such catalyst is used in a liquid phase reaction, the catalyst can easily be separated and recovered after use, as it floats in the liquid phase. The floating characteristics of the active carbon of this invention are shown in FIGS. 2(A) and 2(B) of the annexed drawing. FIG. 2(A) shows that the active carbon of this invention, after having absorbed impurities still floats in water and FIG. 2(B) shows that conventional active carbon, after having absorbed impurities, sinks in water.

The active carbon of this invention may be used for cleaning industrial waste water or urban waste water. When the active carbon is continuously removed upwardly from the lower part of a cleaning tower for waste water while a waste water to be cleaned is continuously flowed downwardly at a controlled rate from the upper part of the tower thereby bringing the active carbon into contact in countercurrent with the waste water, the active carbon forms a floating active carbon layer. The layer floats in the water at a level determined by the difference between the upward force produced by the buoyancy of the carbon in water and the downward force produced by the flow of the water. As the quantity of the stream of water (waste water) decreases the downward force will become smaller so that the active carbon layer will become higher in its floating position to balance both forces. As the quantity of downwardly flowing water increases, the downward force will approach the upward force created by buoyancy so that the layer will float slightly lower in the water. Thus, the floating active carbon layer is variably maintained within a small distance. So long as the flow rate of waste water does not exceed a certain range, individual particles of the active carbon will remain in an expanded floating layer. Experimental results show that the flow rate of waste water necessary for maintaining the expanded floating layer of the active carbon was one-half of the minimum entrainment flow rate (referred to hereinafter as the terminal rate Ut). The minimum entrainment flow rate is that flow rate at which the activated carbon starts to entrain in the downwardly flowing water. Theoretically, the terminal rate Ut is represented according to Stokes' law as follows:

$$Ut = D_p^2 (\rho_1 - \rho_p) g. / 18\mu$$

$D_p$: Particle diameter of the active carbon
$\rho_l$: Density of fluid
$\rho_p$: Particle density of the active carbon
$g$: Acceleration of gravity
$\mu$: Viscosity of liquid When the terminal flow rate is within the range of 0.5–1.0 Ut, the active carbon is not washed away but rather individual particles begin to move freely in three dimensions to form a fluidized layer. To maintain the active carbon layer in the form of an expanded floating layer, therefore, it is preferably to control the flow rate of waste water in the cleaning tower at 0.5 Ut or below.

As described above, the active carbon of this invention, having a hollow microspherical structure, floats in aqueous solutions and therefore, is more easily separated and recovered after use than is conventional active carbon.

The following examples illustrate this invention.

EXAMPLE 1

Hollow microspherical carbon having a bulk density of 0.18 g./cc., a floating capacity in soap water of 90% by weight soap and a carbonization percentage of 85% was prepared according to the method previously described. This hollow microspherical carbon was activated in a conventional manner. The resulting active carbon had a hollow microspherical structure and had a particle diameter of 5–1000$\mu$, a wall thickness of 0.5–50$\mu$ and a bulk specific gravity of 0.05–0.4.

EXAMPLE 2

Figure 4:
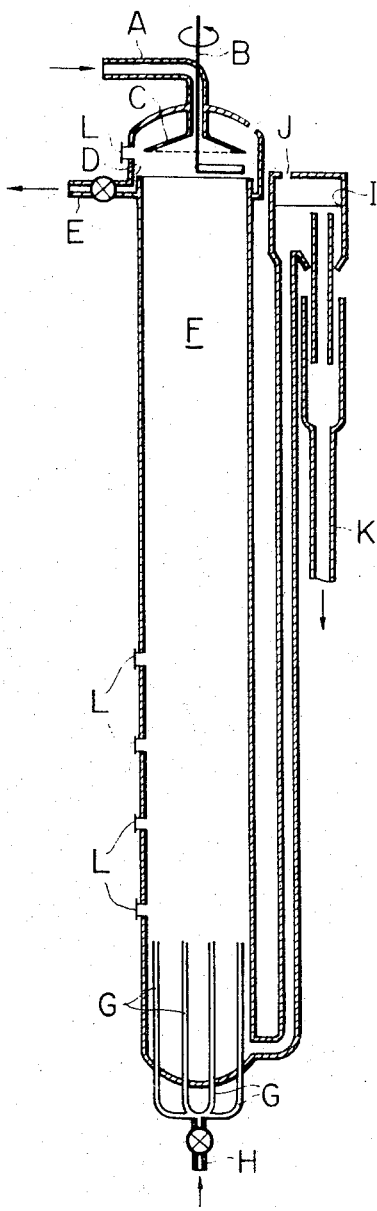

This example illustrates the use of the active carbon obtained in the foregoing Example 1 for the purification of waste water. FIG. 3 is a schematic flow diagram showing the treatment of waste water according to this example. FIG. 4 is a sectional view of the continuous counter-current type cleaning tower used in this example.

Referring to FIG. 3, waste water is first subjected to cushioning in a waste water pond (pool tank) 1 and then supplied through a flow rate regulator 2 to the top of a counter-current type cleaning tower for waste water 3 at at controlled flow rate. The waste water is purified as it passes through the floating active carbon layer in the tower. The purified water is discharged from the lower part of the tower to a drain pipe 5 through a drain tank 4. Active carbon from a regenerating furnace 12 and an active carbon storage tank 6 is conveyed to a mixing tank 7 where the active carbon is mixed with a small amount of clean water from a tank 4 and degassed. The active carbon thus treated in then conveyed to an active carbon slurry tank 8 and supplied to the lower part of the counter-current type cleaning tower 3 where the supplied active carbon forms an expanded floating layer. The deactivated carbon is extracted from the upper surface of the floating layer, conveyed through a line 9 to a washing tower 10 where it is washed with water. The spent carbon thus treated is then dehydrated in a dehydrater 11, regenerated by heating in the regenerating furnace 12 and recycled to the mixing tank 7. Regeneration of the spent carbon can be performed by a conventional method by heating the carbon in an oven at 250–500° C. or in an atmosphere of nitrogen, argon, carbon dioxide or steam or in a vacuum at 250–900° C. The washing water 13 and filtrate 14 from the washing tower 10 and the dehydrater 11 are recycled to the waste water pond 1 for further treatment.

In FIG. 4, a controlled amount of waste water from the flow rate regulator is introduced through a waste water water inlet A into the cleaning tower where the waste water is uniformly sprayed as droplets onto an expanded floating layer F of active carbon by means of a spray nozzle C. The waste water is cleaned, as it is passed through the floating layer F, and is discharged as clean water through a discharge pipe K. Fresh activated carbon is supplied to the bottom of the tower through a supply tube H at a predetermined rate so that the active carbon may be dispersed uniformly to the bottom surface of the floating carbon layer by the aid of distributing tubes G. The active carbon loses its activity as it moves gradually upward in the direction of the floating layer. When the deactivated carbon reaches the top of the floating layer, it is scraped off by means of a skimmer B into a well D and conveyed through an extraction tube E to the regeneration process. A liquid level adjusting tube I is moved up or down as required to adjust the upper level of the floating layer to a point where the feed rate of the active carbon is balanced with the extraction rate of the spent carbon. In FIG. 4, J represents an open viewing port and L represents a glass-covered viewing port.

EXAMPLES 3 AND 4

Tables 1 and 2 show the results obtained by using a continuous counter-current type cleaning tower for waste water of the type shown in FIG. 2 having a tower length of 12.5 m., an inside diameter of 1.0 m. and an inside cross-sectional area of 0.785 m.[2]. The active carbon used in this operation had a particle size of 60–80 mesh (175–246$\mu$, outer diameter), an average wall thickness of 3–20$\mu$ and an apparent density of 0.135 g./cc. Used as waste water were (Table 1) waste water extracted from a drain exit of the process waste water, PPI, from a petroleum refinery and (Table 2) water used for washing a coke furnace of a petrochemical plant (waste water in a coker bond). In thse experiments, the theoretical terminal flow rate Ut was 52 m.³/h. and thus the range of flow rates, for forming an expanded floating layer, was limited to a maximum of 26 m.³/h.

The operation of the counter-current type cleaning tower for waste water was performed under the following conditions: A real flow rate for the waste water of 15.7 m.³/h., a feed rate for the microspherical active carbon of 10 kg./h. (dry basis), an extracting rate for the spent carbon of 10 kg./h., a residual amount in the tower of microsphorical active carbon of 415 kg., an average residence time for the carbon in the tower of 41.5 h., an average height of the expanded floating layer of 9.3 m., an average residence time of waste water in the expanded floating activated carbon layer of 22.3 min. and a real linear speed of the waste water through the expanded floating layer of 25.0 m./h.

TABLE 1

| Test item | Original waste water (1) | Cleaned water |
|---|---|---|
| pH | 9.0 | 8.7 |
| Oily substances, p.p.m.[a] | 6 | 1. |
| COD, p.p.m.[b] | 30 | 12. |
| Phenols, p.p.m.[c] | 0.2 | 0.01. |
| Cr ions, p.p.m.[d] | 4 | 1. |
| H₂S, p.p.m.[e] | 5 | 0.01. |
| Color | Slight yellow | Colorless. |
| Odor | Strong | None. |

See footnotes at end of Table 2.

TABLE 2

| Test item | Original waste water (2) | Cleaned water |
|---|---|---|
| pH | 8.3 | 8.0. |
| Oily substances, p.p.m.[a] | 3.4 | 7. |
| COD, p.p.m.[b] | 5.1 | 14. |
| Phenols, p.p.m.[c] | 2.4 | 0.03. |
| Cr ions, p.p.m.[d] | 1 | 0.1. |
| H₂S, p.p.m.[e] | 1 | 0.1. |
| Color | Light brown | Colorless. |
| Odor | Strong | None. |

[a] The testing method for plant waste water, JIS K0102 (1964) (the method by extraction with n-hexane).
[b] The testing method for plant waste water, JIS K0102 (1964) (the method using potassium permanganate at 100° C.)
[c] The testing method for plant waste water, JIS K0102 (1964) (the method using 4-aminopyridine).
[d] The testing method for plant waste water, JIS K0102 (1964) (the method utilizing photoelectric colorimetry).
[e] The testing method for sewage (Japan Water Service Association, 1953) (the method using iodine).

The subject matter which the present applicants regard as their invention is defined by the appended claims and applicants make no claim to the process for treating waste water described above.

What is claimed is:
1. Active carbon having a hollow microspherical structure.
2. The active carbon of claim 1 wherein said active carbon has a particle diameter of 5 microns to 1,000 microns, a wall thickness of 0.5 micron to 50 microns and a specific gravity of 0.05 to 0.4.

References Cited

UNITED STATES PATENTS

| | | | |
|---|---|---|---|
| 2,681,318 | 6/1954 | Mayer | 252—444 X |
| 3,347,798 | 10/1967 | Baer et al. | 252—477 R |
| 1,175,732 | 3/1916 | Evans et al. | 252—444 X |
| 3,342,555 | 9/1967 | McMillan | 252—444 X |
| 2,076,646 | 4/1937 | Ingols et al. | 252—444 |
| 2,111,436 | 3/1938 | Pie | 252—444 |

FOREIGN PATENTS

| | | | |
|---|---|---|---|
| 1,458,195 | 10/1966 | France | 252—444 |

PATRICK P. GARVIN, Primary Examiner

U.S. Cl. X.R.

210—40

UNITED STATES PATENT OFFICE
CERTIFICATE OF CORRECTION

Patent No. 3,775,344　　　　　　　　Dated November 27, 1973

Inventor(s) Yasuo Amagi et al.

It is certified that error appears in the above-identified patent and that said Letters Patent are hereby corrected as shown below:

In Col. 1, after the abstract, insert:

-- CROSS-REFERENCE TO RELATED APPLICATION

The effluent treatment process described herein, which employs the active carbon of the present invention, was invented by Shimpei Gomi and Zenya Shiki and is claimed by them in their copending application U.S. Serial No. 385,325, filed August 3, 1973 and entitled EFFLUENT TREATMENT PROCESS. --

Col. 3, line 42, "at" should read -- a --;

line 67, delete "water".

Col. 4, line 38, "microsphorical" should read -- microspherical --.

Signed and sealed this 18th day of June 1974.

(SEAL)
Attest:

EDWARD M. FLETCHER, JR.　　　　　　　C. MARSHALL DANN
Attesting Officer　　　　　　　　　　Commissioner of Patents